US006985490B2

(12) United States Patent
Czeiger et al.

(10) Patent No.: US 6,985,490 B2
(45) Date of Patent: Jan. 10, 2006

(54) EXTENSION OF FIBRE CHANNEL ADDRESSING

(75) Inventors: Moshe Czeiger, Kiryat Shmuel (IL); Yoav Flint, Haifa (IL); Ilya Alexandrovich, Haifa (IL); Victor Gissin, Hagalil (IL)

(73) Assignee: Sancastle Technologies, Ltd., Yokneam (IL)

( * ) Notice: Subject to any disclaimer, the term of this patent is extended or adjusted under 35 U.S.C. 154(b) by 890 days.

(21) Appl. No.: 09/901,661

(22) Filed: Jul. 11, 2001

(65) Prior Publication Data

US 2003/0012204 A1 Jan. 16, 2003

(51) Int. Cl.
*H04L 12/28* (2006.01)

(52) U.S. Cl. .................. 370/401; 370/466; 709/249
(58) Field of Classification Search ............ 370/389, 370/392, 393, 400, 401, 465, 466, 254, 255, 370/351–356, 395.5, 395.51, 395.52; 709/249, 709/238, 245, 237
See application file for complete search history.

(56) References Cited

U.S. PATENT DOCUMENTS

| 6,223,218 | B1 | 4/2001 | Iijima et al. |
| 6,400,730 | B1 | 6/2002 | Latif et al. |
| 6,741,592 | B1 | 5/2004 | Edsall et al. |
| 6,751,191 | B1 | 6/2004 | Kanekar et al. |
| 6,779,016 | B1 | 8/2004 | Aziz et al. |
| 6,834,311 | B2 * | 12/2004 | Rao ........................ 709/245 |
| 6,834,326 | B1 | 12/2004 | Wang et al. |
| 2002/0010790 | A1 * | 1/2002 | Ellis et al. ................ 709/238 |
| 2002/0143983 | A1 * | 10/2002 | Jones et al. ............... 709/237 |
| 2002/0147843 | A1 | 10/2002 | Rao |
| 2002/0156924 | A1 * | 10/2002 | Czeiger et al. ........... 709/249 |

OTHER PUBLICATIONS

Rajagopal, et al., Fibre Channel Over TCP/IP (FCIP), *IPS Working Group*, The Internet Engineering Task Force, available at <www.ietf.org/proceedings/01mar/I–D/ips–fcovertcpip–01.txt>, Nov. 2000, pp. 1–24.
Copy of Office Action for Appln. No. EP 01 108 290.6–2413, issued May 22, 2003, 5 pages.
"Fibre Channel–Physical and Signaling Interface (FC–PH)," American National Standard for Information Technology, American National Standards Institute, 1995.

* cited by examiner

*Primary Examiner*—Ajit Patel
(74) *Attorney, Agent, or Firm*—Sterne, Kessler, Goldstein & Fox P.L.L.C.

(57) ABSTRACT

Apparatus for transferring data, including a first gateway, adapted to operate as a first switch in a first storage area network (SAN) operating according to a Fiber Channel protocol, and which is coupled to receive a data-frame addressed to a virtual address of a receiving client operative in a second SAN. The apparatus also includes a second gateway, adapted to operate as a second switch in the second SAN, which operates according to the Fiber Channel protocol substantially independently of the first SAN. The second gateway is coupled to receive the data-frame from the first gateway, and is adapted to look up a local address of the receiving client in the second SAN by using at least part of the virtual address as an index to an incoming-data-frame translation table, and to transmit the data-frame addressed to a local address of the receiving client.

17 Claims, 6 Drawing Sheets

FIG. 1

PRIOR ART

EXTENSION OF FIBRE CHANNEL ADDRESSING

BACKGROUND OF THE INVENTION

1. Field of the Invention

The present invention relates generally to data transfer, and specifically to data transfer between separated networks operating according to a Fibre Channel protocol.

2. Background Art

Clients who are coupled within a storage area network (SAN) operating according to a Fibre Channel (FC) protocol, such as the FC-PH Fibre Channel protocol, issued by the American National Standards Institute, Washington, D.C., transfer data between themselves in the form of data-frames. Within the SAN, each client is coupled to an FC switch, and the protocol defines the form to which a header of the frame needs to conform. The header comprises a destination address of the client to whom the data-frame is being sent, and a source address of the transmitting client. The protocol requires that each client within the SAN has a unique address.

Figure 1:
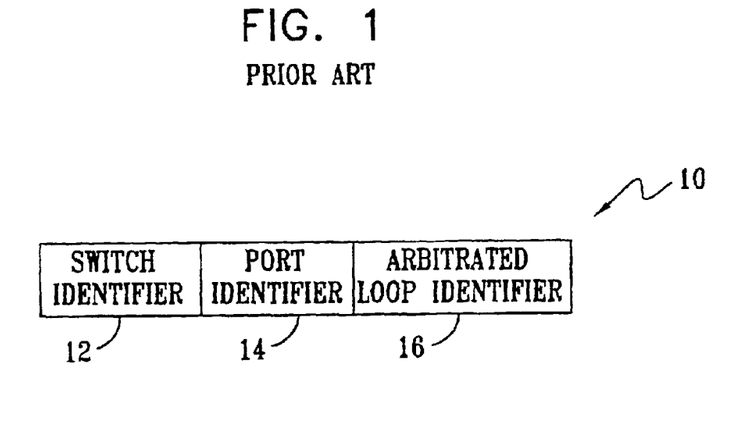
FIG. 1 is a schematic diagram of an address structure according to a Fibre Channel protocol, as is known in the art.

FIG. 1 is a schematic diagram of an address structure 10 according to the Fibre Channel protocol, as is known in the art. Address structure 10 is formed of three bytes, and is used both as a source and a destination address identification when data is transmitted. A first byte 12 is an identifier of the switch to which the client is coupled. The FC protocol limits the number of switches within a SAN, identified via byte 12, to 239. A second byte 14, having up to 256 values, is a port identifier of the switch. A third byte 16 is an arbitrated loop identifier. A client is coupled either directly to a port of the switch, or via an arbitrated loop. The arbitrated loop enables up to 256 clients to be coupled to one port of the switch, at a cost of reduced bandwidth, since all communication for these clients traverses the one port and since the loop does not support parallel data transfer. Theoretically, the maximum number of clients supported by the FC protocol is in the case that every port of a switch has an arbitrated loop coupled to the port. In this case the maximum number of clients is 239*256*256. However, if arbitrated loops are not used, the maximum number of clients supported by the protocol is 239*256.

In order that a plurality of initially separate Fibre Channel SANs may be coupled together to form a compound network, so that data-frames may be sent from a client in a first SAN to a client in a second SAN, the addresses of all the clients in the coupled SANs must be unique. Thus, ensuring that clients in the coupled SANs have addresses which are unique throughout the combination may require changing existing addresses of clients in at least some of the previously separated SANs. In addition, the total number of FC switches in the compound network is limited to 239.

SUMMARY OF THE INVENTION

It is an object of some aspects of the present invention to provide a method and apparatus for coupling together separate Storage area networks (SANs), each operating according to a Fibre Channel (FC) protocol.

It is a further object of some aspects of the present invention to provide a method and apparatus which enables separated SANs operating under the FC protocol to be coupled together without requiring a change of address of a client in the separated SANs.

It is a yet further object of some aspects of the present invention to provide a method and apparatus for increasing the number of supported FC switches above 239.

It is another object of some aspects of the present invention to provide a method and apparatus for coupling a large number of clients within separated SANs operating under the FC protocol without requiring an arbitrated loop.

In preferred embodiments of the present invention a SAN comprises one or more interconnected FC switches and one or more gateways. Each gateway connects, via one or more external interfaces, to one or more gateways of other SANs, forming an FC compound network. The compound network thus comprises two or more SANs. Within each SAN, gateways comprised in the SAN connect via one or more local ports of the gateway to local FC switches. The local FC switches in turn connect via switch ports to clients of the SAN. At least some of the local FC switches are grouped into one or more exclusive groups, herein termed virtual switches. Each virtual switch has an FC switch address, and is considered from outside the SAN to be one FC switch, so that local FC switches within each virtual switch are not recognized as such outside the SAN. Thus, all ports that connect to local FC switches within a specific virtual switch are considered as ports of that virtual switch. Within the FC compound network each virtual switch port has a virtual port address that is globally unique. Within each SAN, addresses of the contained switches and their switch port addresses must be unique only inside each SAN.

By forming local FC switches into virtual switches, the FC compound network is able to support a number of FC switches greatly in excess of 239. Thus, rather than coupling clients to a switch via an arbitrated loop, to support larger numbers of clients as in the prior art, the larger numbers can be coupled directly to switches. Furthermore, formation of the virtual switches does not require changing existing local addresses of clients or their associated local FC switches.

In preferred embodiments of the present invention, each gateway comprises one or more translation tables. The tables map local port addresses, used for data transfer within a specific SAN, into global port addresses, used for data transfer within the compound network. If a port is coupled to a virtual switch, the global port address comprises an address of the virtual switch. The tables also map the global port addresses to local port addresses. Furthermore, each gateway prevents data specifically directed to clients within a SAN, such as Link-State Records (LSRs), from exiting the SAN. Most preferably, in an initialization phase, each gateway advertises its own LSR, the virtual switches, and those local FC switches (if any) that are not part of any group comprised within the gateway's SAN, to the compound network.

In some preferred embodiments of the present invention a SAN has two or more gateways connecting the SAN to the compound network. Such SANs will be able to continue complete operation within the compound network in the event that one of the gateways or a link between SANs fails, so that a complete gateway redundancy is achieved.

Data transfer from a first local SAN to a second local SAN occurs via an originating gateway, herein termed an egress gateway, of the first SAN and a destination gateway, herein termed an ingress gateway, of the second SAN. The egress gateway translates source addresses of outgoing frames from local addresses to global addresses, and the ingress gateway translates the destination addresses of incoming frames from global addresses to local addresses.

To send data from a first SAN client to a second SAN client, the first SAN client uses its own local address as a source address and the global address of the second SAN client (typically coupled to a virtual switch, and so having a corresponding address), as a destination address.

The egress gateway checks the data to identify the source FC switch. If the source switch is a local switch contained within a virtual switch the egress gateway translates the source address of the outgoing frame to a global address and forwards the frame. If not (e.g., the source switch is from some other SAN) the source address is left as is and the frame is forwarded.

The ingress gateway checks the data to identify the destination FC switch. If the destination switch belongs to a virtual switch in the SAN of the ingress gateway, the ingress gateway translates the destination address of the incoming frame to a local address and forwards the frame. If not (e.g., the destination is to some other SAN) the destination address is left as is and the frame is forwarded.

Using the methods described hereinabove enables FC clients in previously separated and independent SANs to communicate with each other without requiring the clients to have explicit globally unique addresses. Furthermore, the apparatus and methods described hereinabove may be retrofitted to existing SANs without requiring changes in existing SAN client addresses.

There is therefore provided, according to a preferred embodiment of the present invention, apparatus for transferring data, including:

a first gateway, adapted to operate as a first switch in a first storage area network (SAN) operating according to a Fibre Channel protocol, and which is coupled to receive a data-frame addressed to a virtual address of a receiving client operative in a second SAN; and a second gateway, adapted to operate as a second switch in the second SAN, which operates according to the Fibre Channel protocol substantially independently of the first SAN, and which is coupled to receive the data-frame from the first gateway, and is adapted to look up a local address of the receiving client in the second SAN by using at least part of the virtual address as an index to an incoming-data-frame translation table, and to transmit the data-frame addressed to a local address of the receiving client.

Preferably, the second SAN includes a plurality of switches configured as a virtual switch, and the virtual address includes a pointer to the virtual switch.

Preferably, at least one of the first and second SANs includes a plurality of switches configured as a virtual switch, so that a total of a number of switches included in the first and second SANs is able to exceed a total number of switches allowed by the Fibre Channel protocol.

Further preferably, the apparatus includes a second plurality of clients directly coupled to the plurality of switches, so that a total of a number of clients included in the first and second SANs is able to exceed a total number of directly-coupled clients allowed by the Fibre Channel protocol.

Preferably, the first gateway is adapted to look up a global address of a transmitting client in the first SAN by using at least part of a transmitting-client-local-address as an index to an outgoing-data-frame translation table.

Preferably, the apparatus includes a coupling which is adapted to transfer data-frames between the first and the second gateways.

Further preferably, the coupling includes one or more intermediate SANs which are coupled to transfer data-frames therebetween.

Alternatively or additionally, the coupling includes one or more data-frame transfer systems chosen from a group of systems including a fiber optic connection, an Ethernet connection, an electrically conductive connection, an electromagnetic transmission, a synchronous optical network (SONET) connection, a synchronous digital hierarchy (SDH) connection, an asynchronous transfer mode (ATM) connection, and a distributed network.

Preferably, the first SAN includes a first plurality of clients each having a respective first local address, and the second SAN includes a second plurality of clients each having a respective second local address, such that at least some of the first local addresses are substantially identical to at least some of the second local addresses.

Preferably, the apparatus includes:

a first coupling connecting the first and second gateways;

a third gateway adapted to operate as a third switch in the first SAN and which is coupled to receive the data-frame; and a second coupling connecting the third and second gateways, so that the data-frame transfers via the second coupling if the first coupling fails.

There is further provided, according to a preferred embodiment of the present invention, a method for transferring data, including:

receiving an initial data-frame in a first gateway operating as a first switch in a first storage area network (SAN), operating according to a Fibre Channel protocol, the initial data-frame comprising a virtual address of a receiving client operative in a second SAN, operating according to the Fibre Channel protocol substantially independently of the first SAN;

transmitting a final data-frame from a second gateway operating as a second switch in the second SAN, the final data-frame including a local address of the receiving client;

conveying at least some of the data-frames between the first and the second SAN via a coupling connecting the SRNs; and converting the initial data-frame to the final dataframe using at least part of the virtual address as an index to an incoming-data-frame translation table comprised in the second gateway.

Preferably, the method includes configuring a plurality of switches included in the second SAN as a virtual switch, and the virtual address includes a pointer to the virtual switch.

Preferably, at least one of the first and second SANs includes a plurality of switches grouped as a virtual switch, so that a total of a number of switches included in the first and second SANs is able to exceed a total number of switches allowed by the Fibre Channel protocol.

Further preferably, the method includes directly coupling a second plurality of clients to the plurality of switches, so that a total of a number of clients included in the first and second SANs is able to exceed a total number of directly-coupled clients allowed by the Fibre Channel protocol.

Preferably, the method includes looking up in the first gateway a global address of a transmitting client in the first SAN by using at least part of a transmitting-client-local-address as an index to an outgoing-data-frame translation table.

Preferably, conveying at least some of the data-frames includes conveying the at least some of the data-frames via one or more SANs intermediate the first and second SANs.

Preferably, the first SAN includes a first plurality of clients each having a respective first local address, and the second SAN includes a second plurality of clients each having a respective second local address, such that at least some of the first local addresses are substantially identical to at least some of the second local addresses.

The present invention will be more fully understood from the following detailed description of the preferred embodiments thereof, taken together with the drawings, in which:

DETAILED DESCRIPTION OF THE INVENTION

Figure 2:
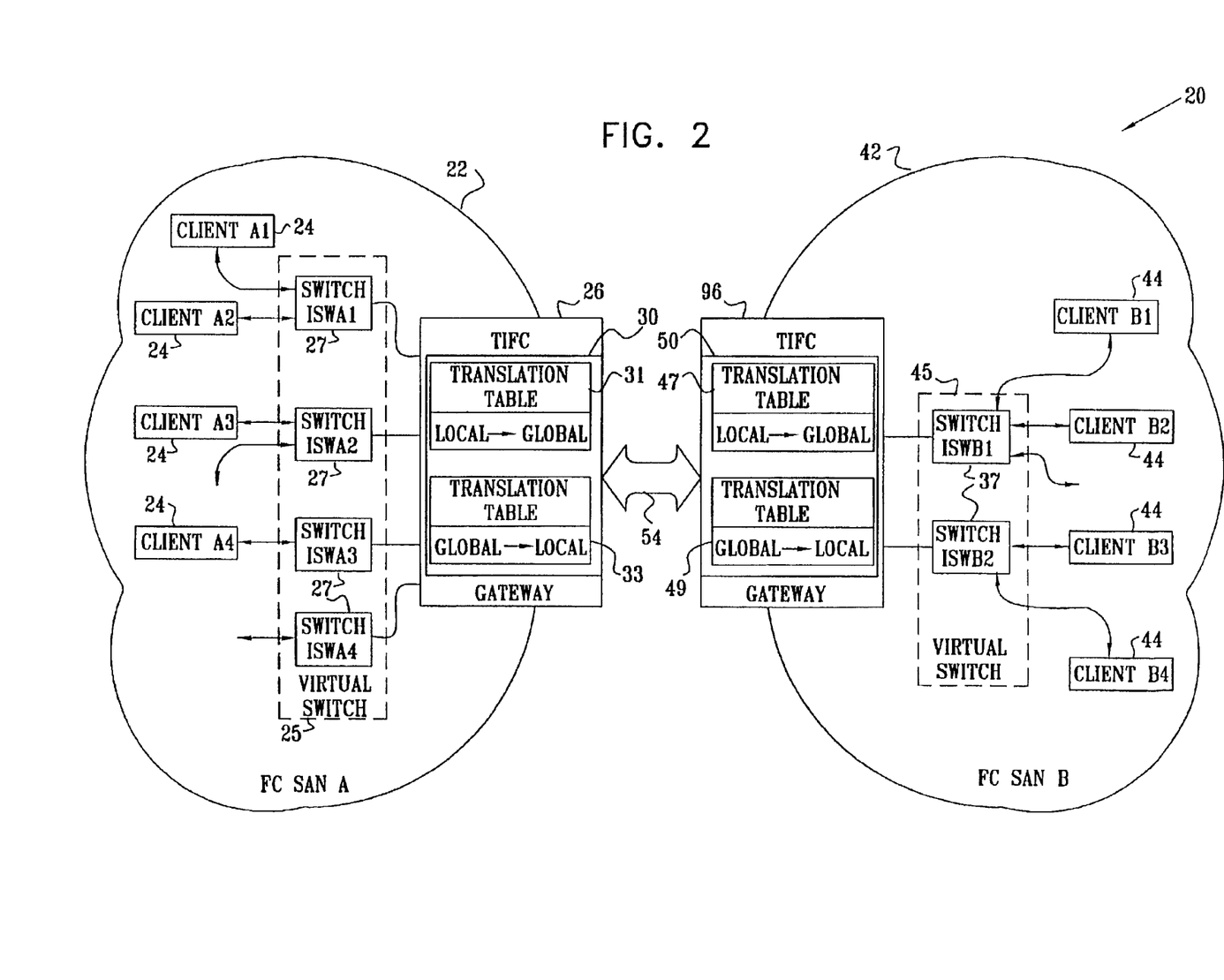
FIG. 2 is a schematic diagram of two Fibre Channel Storage area Networks coupled together as a compound Fibre Channel network system, according to a preferred embodiment of the present invention.

Reference is now made to FIG. 2, which is a schematic diagram of two Fibre Channel Storage area Networks coupled together as a compound Fibre Channel network system 20, according to a preferred embodiment of the present invention. In system 20 a Fibre Channel first Storage area Network 22, also herein termed FC SAN A, comprises a first plurality of generally similar internal switches 27 also termed herein switch ISWA1, switch ISWA2, . . . , which are coupled to transfer data between themselves. As described in more detail below, all internal switches 27 are grouped together as a virtual switch 25. FC SAN A also comprises a second plurality of generally similar clients 24, also termed herein client A1, client A2, . . . , each of which is coupled to one of switches 27. Clients 24 transfer data between themselves, via their respective switches, according to an industry standard Fibre Channel protocol, published by the American National Standards Institute. Each client 24 has a respective address, which is unique within FC SAN A, i.e., each client A1, A2 . . . has a unique local address. Each Client 24 is also allocated a unique global virtual address, described in more detail below, which is used only by clients external to FC SAN A. A client 24 is typically unaware of its global virtual address. Preferably, one of clients 24 acts as a name-server for clients within FC SAN A, the name-server acting, inter alia, to assign local and/or global addresses per client. For example local clients get to know their local addresses, while a gateway (described in more detail below) receives both local and global addresses for updating translation tables in the gateway on the other hand, none-local clients have their global address in the name-server. This address is given to any local client who wants to connect to a remote client.

FC SAN A also comprises a gateway 26, which operates as an FC switch of SAN A and as a connection to a second FC SAN 42, also termed herein FC SAN B. Gateway 26 comprises four FC local ports which couple to respective switches 27. Gateway 26 also comprises a translation external interface (TIFC) 30, which is used to communicate with FC SAN B, via an industry-standard protocol such as an FC protocol or a Gigabit Ethernet protocol. As described in more detail below, TIFC 30 comprises two translation tables for FC SAN A port addresses. A first table 31 for translating from local addresses to global addresses is used as an outgoing-data-frame translation table. A second table 33 for translating from global addresses to local addresses is used as an incoming-data-frame translation table. Gateway 26 is most preferably implemented from one or more custom integrated circuits, such as application specific integrated circuits (ASICs). Alternatively or additionally, gateway 16 is implemented from one or more discrete components, or a combination of discrete components with custom devices.

FC SAN B comprises a plurality of generally similar internal switches 37, also termed herein switch ISWB1, switch ISWB2, . . . . All internal switches 37 are grouped together as a virtual switch 45. FC SAN 3 also comprises a plurality of generally similar clients 44, also termed herein client B1, client B2, . . . , each of which is coupled to one of switches 37. Clients 44 transfer data between themselves according to the same industry standard Fibre Channel protocol and in generally the same manner as FC SAN A. FC SAN A and FC SAN B are adapted to operate substantially independently of each other. Each client B1, B2, . . . has a respective address which is unique within C SAN B. Each client 44 also has a unique global virtual address, which is used only by clients external to FC SAN B. As for clients in SAN A, a client 44 is typically unaware of its global virtual address. Preferably, one of clients 44 acts as a name-server for clients within FC SAN B. It will be appreciated that since FC SAN A and FC SAN B are adapted to operate independently of each other, at least some of the local addresses of clients 24 may be identical to at least some of the local addresses of clients 44.

FC SAN B also comprises a gateway 46, which operates as an FC switch of SAN B and as a connection to SAN A. Gateway 46, preferably implemented substantially as described above for gateway 26, comprises two FC local ports which couple to respective switches 37. Gateway 46 comprises a TIFC 50, which is implemented generally as TIFC 30, and which is used to communicate with SAN A.

TIFC 50 comprises a first translation table 47 translating from local addresses to global addresses and a second table 49 translating from global to local addresses.

Gateway 26 and gateway 46 are coupled to each other by a coupling 54, which enables the gateways to transfer data between themselves by any means known in the art. Preferably, coupling 54 comprises a fiber optic connection, an electrically conductive connection, an Ethernet connection, a synchronous optical network (SONET) connection, a synchronous digital hierarchy (SDH) connection, and/or an asynchronous transfer mode (ATM) connection. Alternatively or additionally, coupling 54 comprises one or more devices known in the art, which enable gateway 26 and gateway 46 to transfer data between themselves via guided or unguided electromagnetic transmissions generated in the gateways. Further alternatively or additionally, coupling 54 comprises one or more distributed networks, so that data transfer between the gateways is via the one or more distributed networks.

Figure 3:
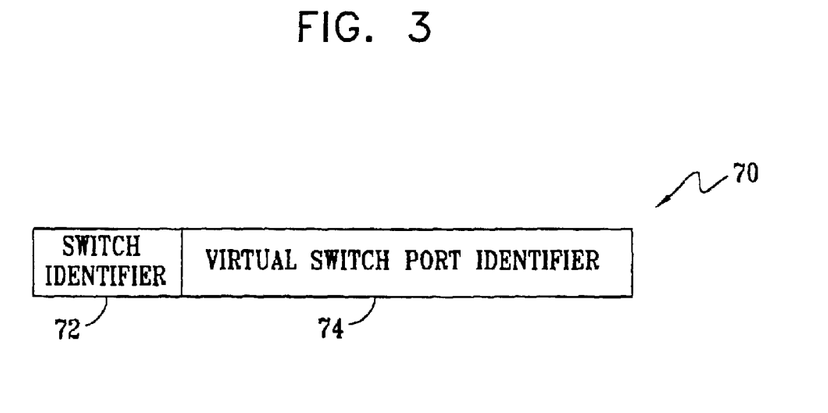
FIG. 3 is a schematic diagram showing structure of a global virtual address used in data-frame transmission in the system of FIG. 2, according to a preferred embodiment of the present invention.

FIG. 3 is a schematic diagram showing structure of a global virtual address 70 used in data-frame transmission in FC system 20, according to a preferred embodiment of the present invention. In preferred embodiments of the present invention address 70 is used, as described in more detail below, as a source identification and/or as a destination identification. Address 70 comprises a switch identifier field 72. Switch identifier field 72 functions substantially as field 12 (FIG. 1), and is recognized as such by the FC protocol, but comprises a virtual switch identifier. A second field 74, comprising 16 bits, is a virtual switch port identifier.

Figure 4:
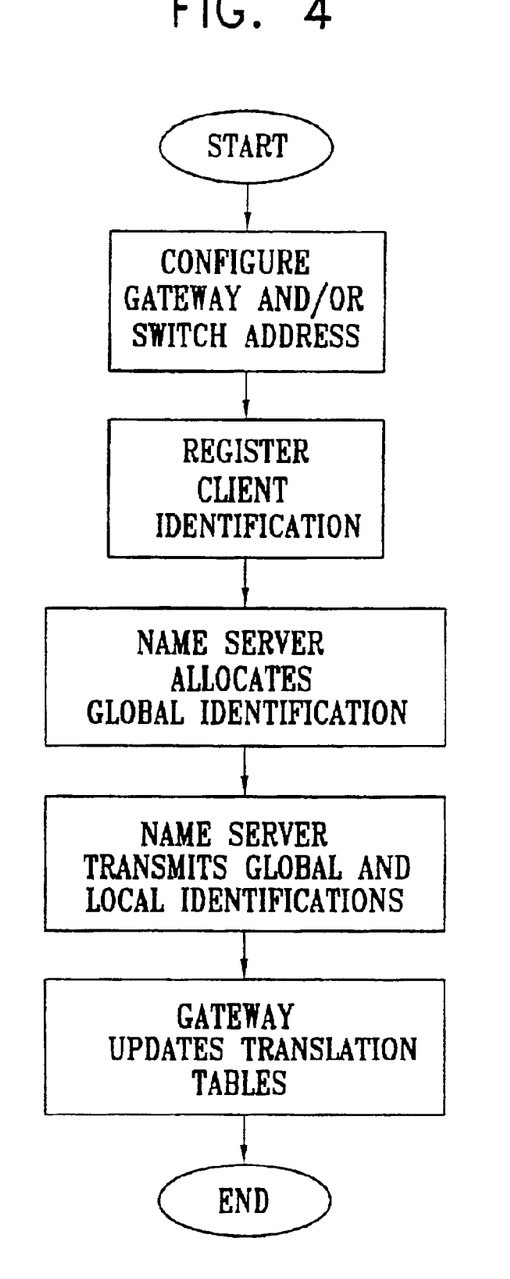
FIG. 4 is a flow chart showing steps comprised in a process for generating entries in translation tables of a gateways between the two Fibre Channel Storage area Networks of FIG. 2, according to a preferred embodiment of the present invention.

FIG. 4 is a flow chart showing steps comprised in a process for generating entries in translation tables 31 and 33 of gateway 26 and translation tables 47 and 49 of gateway 46, according to a preferred embodiment of the present invention. The process illustrated by FIG. 4 most preferably occurs when a client is installed in FC SAN A or FC SAN B. For clarity, the description below is drawn only for the installation of a client in FC SAN A.

In a pre-configuration step, for each new gateway a gateway address is configured at the name-server, and for each new switch a containing virtual switch identification is notified to the name server.

In a client registration step, when a client A3 in FC SAN A is coupled to an FC switch ISWA3, it performs a fabric login. The switch fabric then establishes the link and registers the port to the name-server. The name-server finds the virtual switch identification by the switch identification in the registration request.

The name-server allocates a global port identification for the registered port, based on the virtual switch identification, and sends a couple (Global Address, Local Address) to local gateways such as gateway 26 in FC SAN A.

When gateway 26 receives a couple from a name-server, it updates both translation tables 31 and 33 accordingly.

Other methods for generating translation tables 31, 33, 47, and 49 in gateway 26 and gateway 46, such as by first installing the gateways, and then communicating addresses of clients between the gateways at a time when coupling 54 is implemented, will be apparent to those skilled in the art. All such methods are included in the scope of the present invention.

In operation, when a name-server receives requests from remote name servers for local ports, it uses the global port identification as shown in address structure 70 (FIG. 3) in its replies, rather than the local ones. Also, when it receives a request for a remote port from some local port, it uses the global port identification as shown in address structure 70 (FIG. 3) in its reply. When the name-server receives a request for a local port from another local port, it uses the local port identification as shown in address structure 10 (FIG. 1) in its reply.

Figure 5:
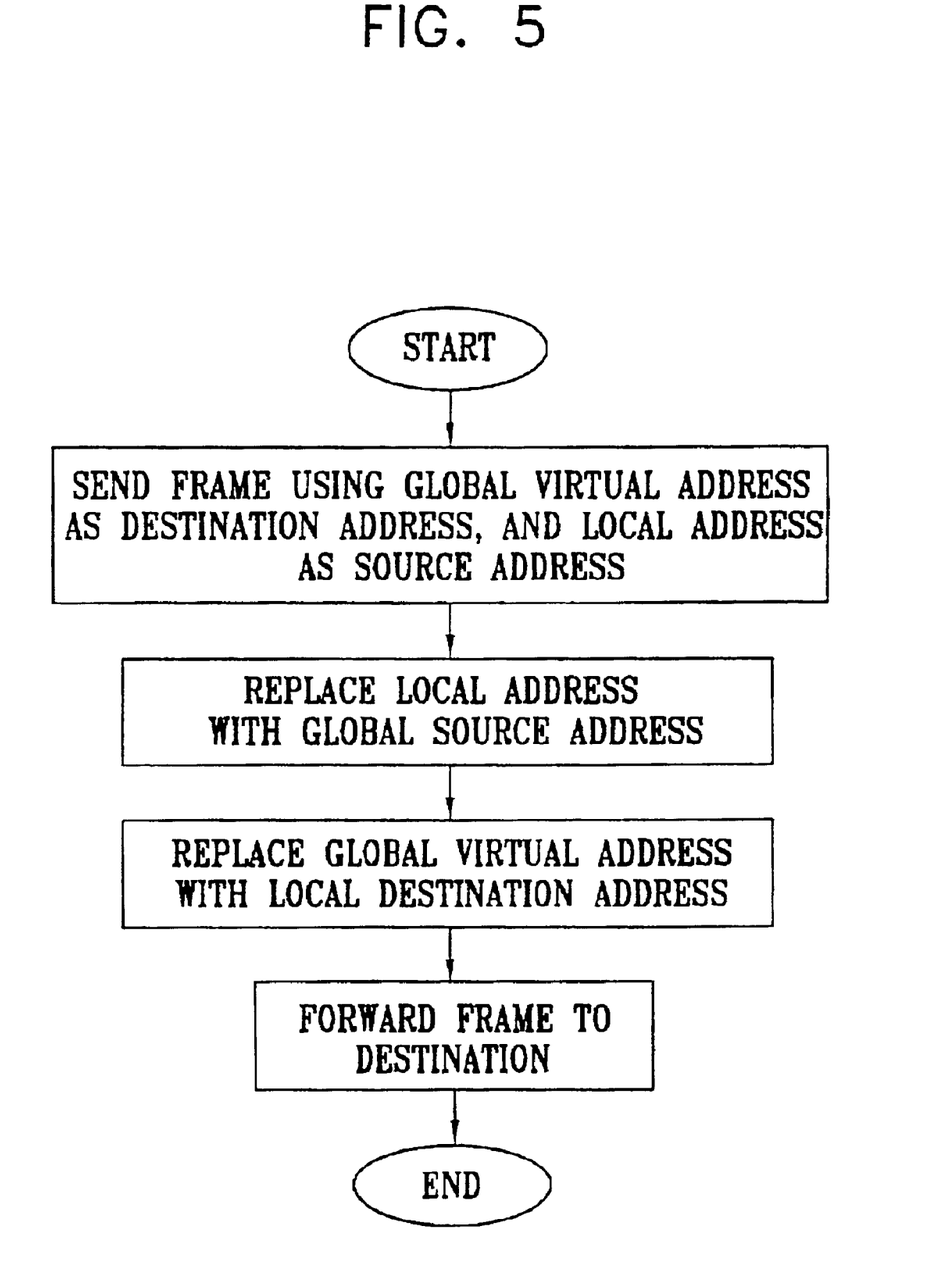
FIG. 5 is a flow chart showing steps comprised in a process for transmitting a data-frame from a client in one of the Fibre Channel Storage area Networks to a client in the other network of FIG. 2, according to a preferred embodiment of the present invention.

FIG. 5 is a flow chart showing steps comprised in a process for transmitting a data-frame from client A3 in FC SAN A to client B4 in FC SAN B, according to a preferred embodiment of the present invention. Client A3 is assumed to be coupled to switch ISWA2, and client B4 is assumed to be coupled to switch ISWB2. The process is assumed to be followed after the process corresponding to FIG. 4 has been implemented for the communicating clients. It will be understood that the description applies, mutatis mutandis, to the forward transfer of data from any client in FC SAN A to specific clients in FC SAN B, and to the reverse transfer of data from any client in FC SAN B to specific clients in FC SAN A.

In an initial step, client A3 sends a data-frame to client B4 by using the global virtual address of client B4 as a destination address. It will be understood that the global virtual address of client B4 comprises the identification of virtual switch 4S as switch identification field 72 (FIG. 3). The data-frame source address is a local source address comprising the identification of local FC switch ISWA2 as switch identifier field 12 (FIG. 1). By virtue of the destination address, the data-frame is forwarded to gateway 26. When the data-frame arrives at gateway 26, which acts as an egress gateway, the local source address is replaced therein by the global virtual address corresponding to client A3. The replacement is performed using translation table 31. In addition, the CRC is corrected and the frame is forwarded via coupling S4 to gateway 46, which acts as an ingress gateway.

When the frame arrives at gateway 46, the gateway recognizes from the destination address that the data-frame is directed to a client at a virtual switch within FC SAN B, and the destination address (the global virtual address of client B4) is replaced by the gateway. The global virtual address is replaced by the local address of client B4, which has the identification of local FC switch ISWB2 as switch identifier field 12. The replacement is implemented in translation table 49. In addition, the CRC of the frame is corrected, and the frame is then forwarded via FC SAN B to client B4.

It will be understood that in transferring a data-frame from FC SAN A to FC SAN B, gateway 26 acts as an egress gateway from a source client's SAN, and gateway 46 acts as an ingress gateway to a destination client's SAN. In acting as an egress or ingress gateway, the gateway performs an appropriate address translation, by virtue of the destination address of the data-frame.

Figure 6:
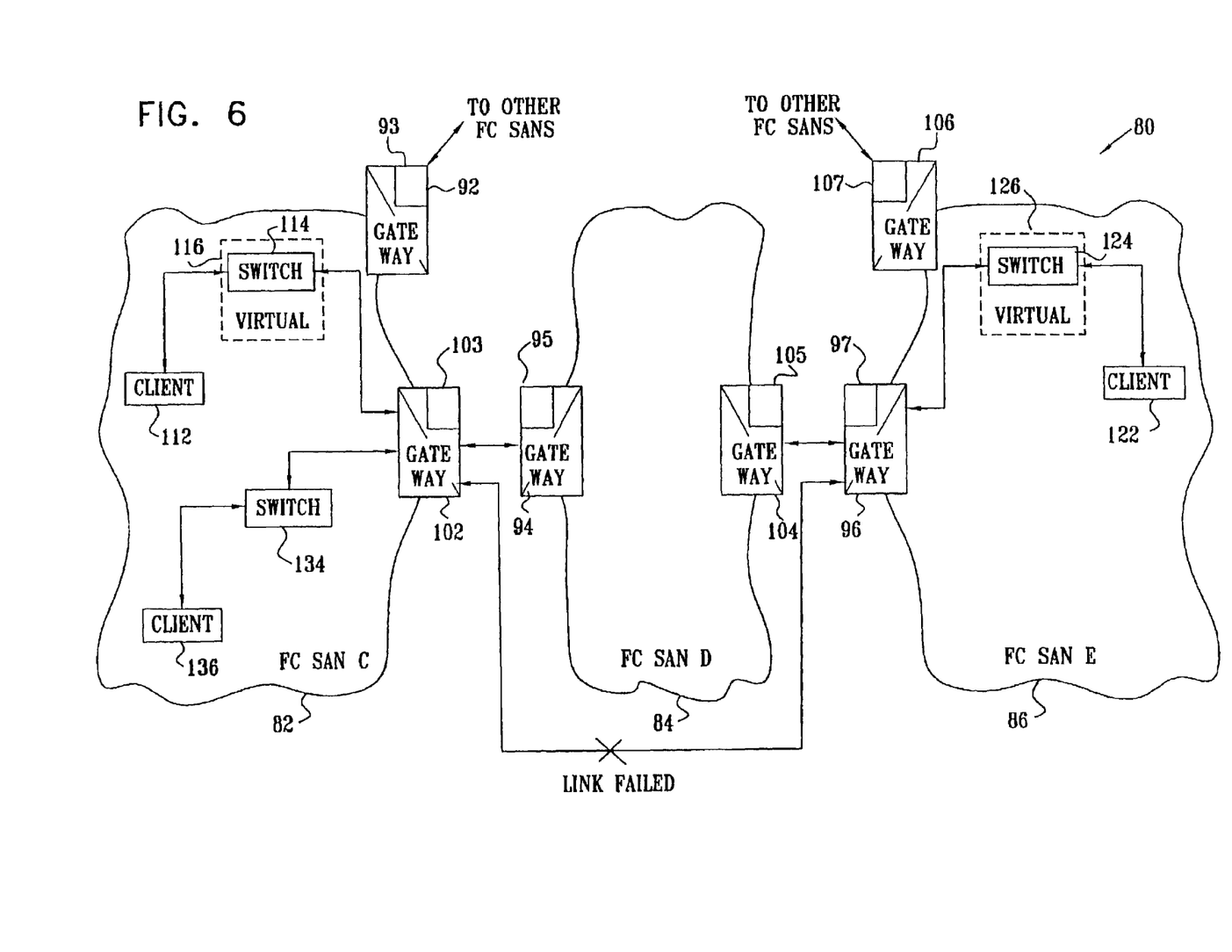
FIG. 6 is a schematic diagram of a plurality of Fibre Channel Storage area Networks coupled together as a Fibre Channel system, according to an alternative preferred embodiment of the present invention.

FIG. 6 is a schematic diagram of a plurality of Fibre Channel Storage Area Networks coupled together as a Fibre Channel system 80, according to an alternative preferred embodiment of the present invention. System 80 comprises a SAN 82, a SAN 84, and a SAN 86, also termed herein respectively FC SAN C, FC SAN D, and FC SAN E, Apart from the differences described hereinbelow, FC SANS C, D, and E are implemented generally as FC SAN A and FC SAN B, each SAN C, D, and E comprising one or more switches and one or more clients, and each SAN C, D and E being able to operate independently according to the same FC protocol.

SAN C comprises two gateways, a gateway 92 and a gateway 102; SAN D comprises two gateways, a gateway 94 and a gateway 104; and SAN E comprises two gateways, a gateway 96 and a gateway 106. Gateways 102 and 94 are coupled together so as to connect SAN C and SAN D directly. Gateways 104 and 96 are coupled together so as to connect SAN D and SAN E directly. Gateways 92 and 106 are coupled to other SANs in system 80. Gateways 102 and 96 are coupled together so as to connect SAN C and SAN E directly. However, the direct link between Gateway 102 and Gateway 96 has failed, thus there is no direct connection between SAN C and SAN E.

It will be appreciated that gateways 92 and 102 comprise substantially the same translation tables in their respective TIFCs 93 and 103, since the tables comprise data specific to clients within SAN C, and the tables are implemented as described above with reference to FIG. 4. Similarly, gateways 94 and 104 comprise substantially the same translation tables in their respective TIFCs 9S and 105, and gateways 96 and 106 comprise substantially the same translation tables in their respective TIFCs 97 and 107.

It will thus be appreciated that for a SAN comprising two or more gateways, should any one gateway within the SAN fail, data may still be transferred in and out of the SAN via a remaining gateway, since all necessary translation data is resident in all gateways. Thus, in a SAN comprising at least two gateways, redundancy, when one of the gateways fails, is assured.

A client 112 in SAN C is coupled to a switch 114, which is in turn grouped in a virtual switch 116. A client 122 in SAN E is coupled to a switch 124, which is in turn grouped in a virtual switch 126. For client 112 to send a data-frame to client 122, client 112 generates the data-frame with a local source address and a virtual destination address. The local source address comprises an identification of switch 114 as switch identifier 12 (FIG. 1). The virtual destination address is implemented as virtual global address 70 (FIG. 3), wherein switch identifier field 72 corresponds to an identification of virtual switch 126.

The data-frame is forwarded from client 112 to its SAN, and is received by gateway 102, which acts as an egress gateway. Gateway 102, by virtue of the destination address being outside SAN C, translates the local source address to a global source address, as described above with respect to FIG. 5, and forwards the converted data-frame to gateway 94. Gateway 94 acts as an ingress gateway, and checks to see if the incoming data-frame destination address corresponds to a local client, i.e., a client in SAN D who belongs to a virtual switch. Since the destination address is directed to a non-local client, gateway 94 transmits the data-frame into SAN D without performing any translation, where it is received by gateway 104.

Gateway 104, acting as an egress gateway, checks the source address of the incoming data-frame. Since the source address belongs to a non-local client, gateway 104 performs no translation, and conveys the data-frame, in a form substantially unchanged from how it exited gateway 102, to gateway 96.

Gateway 96 acts as an ingress gateway, and checks the destination address of the data-frame. Since the destination address is directed to client 122 of virtual switch 126 within SAN E, and since the destination address is virtual, gateway 96 translates the virtual destination address to a local destination address, as described above with respect to FIG. 5. The data-frame is then forwarded into SAN E.

It will be understood that substantially any number of SANs may be implemented in a path between SAN C and SAN E. As described above, during transfer of a dataframe from a client in SAN C to a client in SAN E, the only translation of addresses occurs at a gateway comprised in the source SAN and at a gateway comprised in the destination SAN.

It will also be understood that while an FC switch may be grouped advantageously within a virtual switch, there is no necessity to implement the grouping for a particular switch. By way of example, a switch 134 in SAN C is not grouped into a virtual switch grouping. A client 136 of switch 134 is able to send a data-frame to client 122 substantially as described above for the data-frame from client 112. Since switch 134 is not grouped into a virtual switch grouping, the source address used by client 136 is transmitted onwards, without translation, by gateway 102. The only translation in this case is at gateway 96, when the gateway translates the virtual destination address to a local destination address, as described above.

It will be appreciated that preferred embodiments of the present invention can be implemented for data transfer between large numbers of FC SANs in a coupled system of SANs. There is a trade-off between the number of globally unique switch identifiers, corresponding to field 72 (FIG. 3) and the number of locally unique switch identifiers, corresponding to field 12 (FIG. 1). For example, if 100 global switch identifiers are used, then 139 identifiers can be used locally in each SAN. If there are 50 SANs, then the number of internal switches can reach 139*50.

As explained in the Background of the Invention, FC systems known in the art require arbitrated loops, i.e., indirect coupling of a client to a switch, in order to support large numbers of clients within the network. Preferred embodiments of the present invention enable substantially the same maximum number of clients as is supported by the FC protocol to be implemented by grouping switches within a SAN into a virtual switch. Grouping switches into a virtual switch enables the clients to be coupled directly to their respective switches, without requiring an arbitrated loop, and still be supported by the FC protocol.

It will be appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

What is claimed is:

1. Apparatus for transferring data, comprising:
   a first gateway, adapted to operate as a first switch in a first storage area network (SAN) operating according to a Fibre Channel protocol, and which is coupled to receive a data-frame addressed to a virtual address of a receiving client operative in a second SAN; and
   a second gateway, adapted to operate as a second switch in the second SAN, which operates according to the Fibre Channel protocol substantially independently of the first SAN, and which is coupled to receive the data-frame from the first gateway, and is adapted to look up a local address of the receiving client in the second SAN by using at least part of the virtual address as an index to an incoming-data-frame translation table, and to transmit the data-frame addressed to a local address of the receiving client.

2. Apparatus according to claim 1, wherein the second SAN comprises a plurality of switches configured as a virtual switch, and wherein the virtual address comprises a pointer to the virtual switch.

3. Apparatus according to claim 1, wherein at least one of the first and second SANs comprises a plurality of switches configured as a virtual switch, so that a total of a number of switches comprised in the first and second SANs is able to exceed a total number of switches allowed by the Fibre Channel protocol.

4. Apparatus according to claim 3, and comprising a second plurality of clients directly coupled to the plurality of switches, so that a total of a number of clients comprised in the first and second SANs is able to exceed a total number of directly-coupled clients allowed by the Fibre Channel protocol.

5. Apparatus according to claim 1, wherein the first gateway is adapted to look up a global address of a transmitting client in the first SAN by using at least part of a transmitting-client-local-address as an index to an outgoing-data-frame translation table.

6. Apparatus according to claim 1, and comprising a coupling which is adapted to transfer data-frames between the first and the second gateways.

7. Apparatus according to claim 6, wherein the coupling comprises one or more intermediate SANs which are coupled to transfer data-frames therebetween.

8. Apparatus according to claim 6, wherein the coupling comprises one or more data-frame transfer systems chosen from a group of systems comprising a fiber optic connection, an Ethernet connection, an electrically conductive connection, an electromagnetic transmission, a synchronous optical network (SONET) connection, a synchronous digital hierarchy (SDH) connection, an asynchronous transfer mode (ATM) connection, and a distributed network.

9. Apparatus according to claim 1, wherein the first SAN comprises a first plurality of clients each having a respective first local address, and the second SAN comprises a second plurality of clients each having a respective second local address, such that at least some of the first local addresses are substantially identical to at least some of the second local addresses.

10. Apparatus according to claim 1, and comprising:
a first coupling connecting the first and second gateways;
a third gateway adapted to operate as a third switch in the first SAN and which is coupled to receive the data-frame; and
a second coupling connecting the third and second gateways, so that the data-frame transfers via the second coupling if the first coupling fails.

11. A method for transferring data, comprising:
receiving an initial data-frame in a first gateway operating as a first switch in a first storage area network (SAN), operating according to a Fibre Channel protocol, the initial data-frame comprising a virtual address of a receiving client operative in a second SAN, operating according to the Fibre Channel protocol substantially independently of the first SAN;
transmitting a final data-frame from a second gateway operating as a second switch in the second SAN, the final data-frame comprising a local address of the receiving client;
conveying at least some of the data-frames between the first and the second SAN via a coupling connecting the SANs; and
converting the initial data-frame to the final data-frame using at least part of the virtual address as an index to an incoming-data-frame translation table comprised in the second gateway.

12. A method according to claim 11, and comprising configuring a plurality of switches comprised in the second SAN as a virtual switch, wherein the virtual address comprises a pointer to the virtual switch.

13. A method according to claim 11, wherein at least one of the first and second SANs comprises a plurality of switches grouped as a virtual switch, so that a total of a number of switches comprised in the first and second SANs is able to exceed a total number of switches allowed by the Fibre Channel protocol.

14. A method according to claim 13, and comprising directly coupling a second plurality of clients to the plurality of switches, so that a total of a number of clients comprised in the first and second SANs is able to exceed a total number of directly-coupled clients allowed by the Fibre Channel protocol.

15. A method according to claim 11, and comprising looking up in the first gateway a global address of a transmitting client in the first SAN by using at least part of a transmitting-client-local-address as an index to an outgoing-data-frame translation table.

16. A method according to claim 11, wherein conveying at least some of the data-frames comprises conveying the at least some of the data-frames via one or more SANs intermediate the first and second SANs.

17. A method according to claim 11, wherein the first SAN comprises a first plurality of clients each having a respective first local address, and the second SAN comprises a second plurality of clients each having a respective second local address, such that at least some of the first local addresses are substantially identical to at least some of the second local addresses.

* * * * *